United States Patent [19]

Wikdahl

[11] 4,092,130
[45] May 30, 1978

[54] PROCESS FOR THE SEPARATION OF GAS MIXTURES INTO COMPONENT FRACTIONS ACCORDING TO THEIR MOLECULAR OR ATOMIC WEIGHT

[76] Inventor: Nils A. L. Wikdahl, Bravallavagen 42, Djursholm, Sweden

[21] Appl. No.: 672,378

[22] Filed: Mar. 31, 1976

Related U.S. Application Data

[63] Continuation-in-part of Ser. No. 655,046, Feb. 4, 1976, abandoned, and Ser. No. 353,148, Apr. 20, 1973, abandoned, and Ser. No. 72,951, Sep. 17, 1970, Pat. No. 3,747,306, said Ser. No. 655,046, is a continuation-in-part of Ser. No. 521,109, Nov. 5, 1974, abandoned, which is a continuation-in-part of Ser. No. 353,288, Apr. 23, 1973, abandoned, which is a continuation-in-part of Ser. No. 53,712, Jul. 10, 1970, abandoned, said Ser. No. 353,148, is a continuation-in-part of Ser. No. 53,712.

[51] Int. Cl.$^2$ ............................................. B01D 45/12
[52] U.S. Cl. ........................................... 55/15; 55/17; 55/345; 55/419; 55/459 R
[58] Field of Search ................. 55/17, 15, 459 R, 419, 55/345

[56] References Cited

U.S. PATENT DOCUMENTS

| | | | |
|---|---|---|---|
| 2,765,918 | 10/1956 | Fontein et al. | 55/459 R |
| 3,129,075 | 4/1964 | Anliot | 55/17 |
| 3,160,490 | 12/1964 | Fabre et al. | 55/459 R |
| 3,415,374 | 12/1968 | Wikdahl | 55/459 R |
| 3,460,318 | 8/1969 | Creatz | 55/17 |
| 3,747,306 | 7/1973 | Wikdahl | 55/17 |
| 3,892,070 | 7/1975 | Bose | 55/17 |

FOREIGN PATENT DOCUMENTS

| | | | |
|---|---|---|---|
| 1,245,329 | 7/1967 | Germany | 55/17 |

*Primary Examiner*—Bernard Nozick

[57] ABSTRACT

A process is provided for separation of gas mixtures into component fractions according to their molecular or atomic weight. The mixture is subjected to the centrifugal force applied in a cone-shaped vortex having a diameter of not over 5 mm. at a gas feed absolute pressure from about 5 to about 1000 mm. of mercury, and a pressure ratio within the range from about 1.5 to about 10. In the case where an inert gas is used in admixture with the gas mixture, the gas feed pressure can exceed 1000 mm. of mercury, and gas inlet and outlet pressures can range up to the liquefaction pressure of any gas in the mixture at the operating temperature. The higher molecular or atomic weight fractions are separated from an outer or peripheral portion of the vortex, and the lower molecular or atomic weight fractions are separated from an inner or core portion of the vortex.

29 Claims, 4 Drawing Figures

PROCESS FOR THE SEPARATION OF GAS MIXTURES INTO COMPONENT FRACTIONS ACCORDING TO THEIR MOLECULAR OR ATOMIC WEIGHT

This application is a continuation-in-part of Ser. No. 655,046 filed Feb. 4, 1976, which in turn is a continuation of Ser. No. 521,109, filed Nov. 5, 1974, which in turn is a continuation-in-part of Ser. No. 353,288, filed Apr. 23, 1973, which in turn is a continuation-in-part of Ser. No. 53,712, filed July 10, 1970, and of Ser. No. 353,148, filed Apr. 20, 1973, which in turn is a continuation-in-part of Ser. No. 53,712, filed July 10, 1970, all of these applications now being abandoned, and a continuation-in-part of Ser. No. 72,951, filed Sept. 17, 1970, now U.S. Pat. No. 3,747,306, issued July 24, 1973.

Methods for the separation of gas mixtures into component fractions according to their molecular or atomic weight are easy to devise in principle, but in practice rather difficult to reduce to or embody in the form of a workable apparatus. Because the components differ in molecular weight, they can be separated according to mass. Because the molecules or atoms are different, it is also possible to separate them by applying an electric or magnetic field, and taking advantage of the different response of different types of molecules or atoms to such fields. Thus, for example, isotopes of particular nuclear spin can be singled out, provided an atomic beam of the element in question can be produced, and the atoms have a non-zero electronic spin in the ground state. Other arrangements acting on ion beams are possible, such as mass filters, which make use of the focusing action on ions of an electric quadrupole field. A superimposed high frequency field brings ions of one particular mass into resonance, and throws them out of the beam. Electric fields are more easily maintained than magnetic fields, and an array of many beams operating in parallel can easily be arranged. However, these are only laboratory methods, and are not suitable for use on a large scale, because of the cost and equipment needed.

The difference in mass gives rise to a difference in diffusion rate, and this has been utilized commercially in the separation or enrichment of isotopes, especially of uranium. The mixture of gases is caused to impinge on a porous membrane in which the pores are small enough for molecular flow to take place, and so the lighter molecules pass more readily through the pores than the heavier ones. The mixture can thus be separated by flowing it along the membrane surface; the portion that passes through is enriched as to the lighter component, and the portion that does not is enriched as to the heavier component. In the case of U 235 and U 238, the fractional change in the concentration of the two isotopes is very small, so many separation stages are needed.

The gas centrifuge uses a rotating cylinder with annular entry ports at one end thereof. The gas is collected at the other end of the cylinder in two annuli. The heavier components are concentrated in the outer exit annulus, and the lighter components in the inner exit annulus. It is also possible by various techniques to cause the gas to circulate several times through the rotor, passing in one direction along the periphery and in the other at a smaller radius. However, Avery, *Physics Bulletin,* 1970, pages 17 to 21 (January, 1970) points out that within current engineering limitations for such equipment the size of the individual machine is such that the separative work output is orders of magnitude less than that of a diffusion plant stage, and a centrifuge enrichment plant for practical purposes will require hundreds of thousands of machines. This means that methods must be developed for mass producing the machines and the components at low cost, and this means a major design problem. Avery points out that while a gas centrifuge may be technically feasible, it remains yet to be seen if it be practical, since cost indications are very speculative, since it has not been tested except in small-scale experiments.

It has been proposed to utilize the inertia effects arising from differences in mass in a gas centrifuge without employing moving parts. One rather obvious method is to rotate the gas in a cyclone, in which it would be expected that the heavier molecules would diffuse outward and the lighter towards the center of the cyclone. However, in order to maintain a cyclone a certain inward flow of the gas mixture is necessary, and both components move towards the center, though at a different rate.

Noller an Murtz, *Naturwissenschaften* 1958 45 (16), pages 382-3, reported some separation, but had difficulties with turbulence at high Reynolds numbers. The result is that this method has not been attractive, and it has been considered that at best, the separation obtained should be similar to that of the diffusion method, but since the power consumption is high, the advantage of the centrifuge over gas diffusion is lost. Thus, London has stated in his text *Separation of Isotopes* (London, George Newnes Limited) that as the whole process is less straightforward than the diffusion method, it is not likely to offer any advantage.

Avery, *Physics Bulletin* 1970, pages 17 to 21, points out that the gas centrifuge was tried as part of the U.S. Manhattan Project, but it was the gaseous diffusion method that was adopted as more practical, and the USAEC is indicating its preference still to be for the diffusion method, in preference to moving to a new process.

In accordance with the invention, it has been determined that gaseous mixtures of components differing in molecular or atomic weight can be separated into component fractions according to molecular or atomic weight, if the mixture be subjected to centrifugal force applied to a cone-shaped vortex having a diameter of not over 5 mm. at a gas feed absolute pressure of from about 5 to about 1000 mm. of mercury and a pressure ratio within the range from about 1.5 to about 10. The pressure ratio is defined as $$P_{inlet} \text{ mm. Hg.} / P_{core outlet} \text{ mm. Hg.}$$

Under these operating conditions, which are quite important to the separation, it is possible to isolate a higher molecular weight fraction in a peripheral portion of the vortex, and a lower molecular weight fraction in a core portion of the vortex. This method is simple and straightforward, requires no equipment with moving parts, apart from the gas propulsion equipment, and is practical for operation commercially on a large scale.

In the case where an inert gas is used in admixture with the gas mixture, the gas feed pressure can exceed 1000 mm. of mercury, and gas inlet and outlet pressures can range up to the liquefaction pressure of any gas in the mixture at the operating temperature. The pressure ratio accordingly can be less than 1.5.

If the gas components are quite different in molecular or atomic weight, it may be possible to effect a good separation in one cyclone stage. If they are rather close in molecular or atomic weight, it may be necessary to repeat the process in several stages, recovering the higher molecular weight or lower molecular weight fraction each time from the appropriate portion of the vortex, and then recycling to a further cyclone stage. In the case of the separation of isotopes, such as separating U 235 U 238, it may be necessary to apply from one to several hundred cyclone stages for a satisfactory enrichment of the core portion of the vortex.

Accordingly, the process in accordance with the invention for separation of gas mixtures into component fractions according to their molecular or atomic weight comprises subjecting the mixture to the centrifugal force applied in a cone-shaped vortex having a diameter of not over 5 mm. at a gas feed absolute pressure within the range from about 5 to about 1000 mm. of mercury, and a pressure ratio $P_{inlet}$ mm. Hg./$P_{core\ outlet}$ mm. Hg.

within the range from about 1.5 to about 10, discharging a higher molecular weight fraction from a peripheral portion of the vortex, and separating a lower molecular weight fraction from a core portion of the vortex.

In the case where an inert gas is used in admixture with the gas mixture to be separated, the process comprises subjecting mixture to the centrifugal force applied in a cone-shaped vortex having a diameter of not over 5 mm. at a gas feed absolute pressure of at least 5 mm. of mercury, and a pressure ratio $P_{inlet}$ mm. Hg./$P_{core\ outlet}$ mm. Hg.

of up to about 10, discharging a higher molecular weight fraction from a peripheral portion of the vortex, and separating a lower molecular weight fraction from a core portion of the vortex.

Apparatus for carrying out the process in accordance with the invention comprises a housing with a separate chamber therein that is circular in cross-section, has a first end and a second end, has a diameter at the first end of at most 5 mm., and a diameter at the second end of at least 0.01 mm.; and has a cone angle within the range from 0° to 90°; at least one gas inlet through the housing at the first end, arranged for tangential flow of gas from outside the housing into the chamber, to establish a vortical gas flow in the chamber from the first end towards the second end, with the gaseous components distributed towards the periphery of the vortex with increasing molecular or atomic weight, and towards the core of the vortex with decreasing molecular or atomic weight, the vortex core having a lower gas pressure than the vortex periphery; an outlet through the housing in axial alignment to the chamber at the first end of the chamber; and an outlet through the housing in axial alignment to the chamber at the second end of the chamber, one end outlet receiving peripheral vortical gas flow from the chamber, and the other end outlet receiving core vortical gas flow from the chamber, so that lower molecular or atomic weight components are concentrated in the flow withdrawn via the one outlet, and higher molecular or atomic weight components are concentrated in the flow withdrawn via the other outlet. This cyclonic separator is simple and straightforward in construction, has no moving parts, and is practical for commercial gas separation on a large scale despite its small size.

The centrifugal forces in the vortex cause the heavier molecular weight or atomic weight particles to diffuse towards the periphery of the vortex, and the lighter molecular or atomic weight particles to diffuse into the central or core portion of the vortex. The core portion of the vortex is at a lower gas pressure than the peripheral portion. Since in the apparatus of the invention the peripheral portion and core portion of the vortex are drawn off at opposite ends of the separator chamber, two opposing or countercurrent flows are created within the separator chamber, a peripheral portion flow, flowing in one direction towards the peripheral portion or one end outlet, and a core portion flow flowing in the opposite direction, towards the core portion or the other end outlet. This in effect appreciably extends the zone of separation.

The cyclonic separators used in the process of the invention can be formed of any suitable material that is resistant to attack or corrosion by the gas mixtures to be separated under the operating conditions. Metals can be used, such as stainless steel and aluminum, and nickel and chromium alloys. However, unless the metal can be cast, it is difficult to shape it in the very small sizes required in the invention. Ceramic, glass and plastic materials that are strong, resistant to pressure, and capable of retaining their shape under the gas pressures to be encountered, are therefore preferred. Such materials can be shaped or molded by injection or compression molding into the shapes desired, and can be manufactured in quantity without detriment. Materials such as glass, porcelain, nylon, polyfluorohydrocarbons, such as polytetrafluoroethylene and chlorotrifluoroethylene polymers, polyesters, polycarbonates, polyolefins such as polyethylene, polypropylene, polybutylene, synthetic rubbers, phenol-formaldehyde, urea-formaldehyde, and melamine-formaldehyde resins are suitable, as well as polyoxymethylene.

In the preferred embodiment of cyclonic separator, the separator chamber is conical, and a tubular baffle extends from the base end outlet into the chamber to a point beyond the gas inlet or inlets, to deflect gas flow away from the base end outlet, and enhance initiation of a gas vortex at the base end, and thence through the chamber towards the apex end outlet.

The tangential orientation of the one or more gas inlets imparts a cyclonic or vortical flow to the gas mixture being introduced. The inlets should be uniformly spaced, if there is more than one, for initiation of a uniform vertical flow. Usually, from two to six gas inlets are sufficient. Then, when the gas is introduced into the chamber at high velocity, it is constrained by the curved walls of the separator chamber into a vortex which flows helically towards the apex end or peripheral portion outlet end of the chamber.

It is important that the vortex defined within the cyclone separator chamber (but not necessarily the separation chamber, which can be cylindrical) have a diameter of not over 5 mm., and preferably 2 mm. or less, and still more preferably between 1 mm and 0.1 mm. The lower limit on diameter is imposed by the practicality of manufacture of small cyclones. A practical lower limit appears to be 0.1 mm.

The length of the separator chamber together with the diameter determines the volume of the separator chamber, and the volume in turn determines the residence time of the gases therein, which of course must be sufficient for the desired separation. Accordingly, the length and diameter are selected to give a chamber of the determined volume for the separation. Thus, the length should not be greater than 200 mm. nor less than 0.1 mm., and if the chamber is conical in shape, it should be at least 0.1 mm. in diameter at the apex end.

The cone angle of the vortex, i.e. the angle at the apex end of the vortex, in either a cylindrical or conical chamber (by extrapolation of the cone sides to their meeting point) is within the range from 1° to 90°, preferably from about 3° to about 30°. The cone of the vortex is of course truncated. Good results have been obtained at a ratio of the diameter at the base of the cone to the diameter at the apex of the cone $D_{base}/D_{apex}$ outlet from 1.3 to 3.5, and at a ratio of the base diameter to core outlet diameter $D_{base}/D_{core}$ outlet of from 1.3 to 3.5.

It has been determined in accordance with the invention that it is not possible to effectively separate gas components according to their molecular or atomic weight, if the vortex has a larger diameter than 5 mm., and since cyclone chambers heretofore have been considerably larger, this is probably one of the reasons why cyclonic separators have not heretofore been employed for this purpose. If the vortex is larger in diameter than 5 mm., both components move towards the center of the vortex at too great a rate to permit effective separation, and the problems noted by London begin to be encountered. Hence, the small size overcomes the difficulties that previous workers in the field have encountered with cyclone gas separators.

The shape of the vortex is quite significant. It has been found that a high separation efficiency is obtained in conically shaped chambers. A conical chamber must decrease in diameter towards the apex end, reducing the radius of the vortex and increasing centrifugal force.

The terms "cone shaped" or "conically shaped" as used herein refer to the effective cone shape of the vortex, i.e., to the decreased diameter of the vortex at the apex outlet end as compared to the diameter at the inlet end or base outlet end. The vortex is in effect a cone if the separator chamber at the apex outlet has a lower diameter than the chamber at the inlet. If this is the case, the vortex in the chamber will be reduced in diameter towards the apex end, even if the shape of the chamber in between the ends is not a straight-sided cone but, for example, a cylinder.

The chamber can be in the form of a straight-sided right angle cone from base end to apex end. It can also be partly or wholly cylindrical, and cone-shaped, if at all, only at the apex end. The cone shape need not be uniform or straight-sided. Convexly and concavely curved sides can be used, of uniform or increasing or decreasing curvature. The diameter can decrease continuously towards the apex end, or in stages. A cone with straight sides but with varying cone angles can be used. Thus, a variety of cone shapes are possible, and the shape chosen will depend on the particular conditions of the separation to be carried out, and may be determined by trial-and-error experimentation.

It is also important to have a pressure drop between the gas inlet and the apex and core gas outlets sufficient to cause an acceleration in the velocity of the gas as it approaches the region of lesser diameter in the core. This gives maximum centrifugal force for separation in the region of smallest radius. As pressure drops, pressure energy or pressure head is converted to velocity head, and velocity increases. Thus, the energy needed to accelerate the particles and thereby make the separation possible is obtained from the pressure drop. It is for the reason that the pressure ratio is quite critical to the process of the invention.

This means also that the maximum separating effectiveness can be at a region within the vortex where the radius is small, instead of at the periphery of the vortex, and this region is where the maximum separating effect is needed, at the boundary between the core and peripheral regions, where the gas flow towards the apex and core outlets is in different directions. This means that the core region is the region where the heavier particles have the greatest chance of being thrown out, if they have managed to get that far, and this aids in ensuring that they do not remain with the core flow at the core region outlet.

Consequently, the base inlet, apex outlet and core outlet diameters are selected so that the pressure ratio $$P_{inlet} \text{ mm. Hg.}/P_{core\ outlet} \text{ mm. Hg.}$$

is within the range from about 1.5 to about 10, at the operating gas feed absolute pressure within the range from about 5 to about 1000 mm. of mercury. In effect, this means that the gas pressure at the gas inlet is at least 1.5 times up to about 10 times the pressure at the core outlet of the chamber. Preferably, for optimum separation efficiency, the pressure ratio is within the range from about 2 to about 6.

In the case where an inert gas is used, the gas inlet and outlet pressures can be much higher. The upper limit is in fact the liquefaction pressure for any gas present in the mixture at the operating temperature. A practical upper limit for gas inlet and outlet pressure is 500 atmospheres.

In consequence, the pressure ratio can be less than 1.5. A practical lower limit is 0.001. The upper limit remains at 10 in this case. The preferred pressure ratio range is from 0.1 to 6.

The process can be operated at any convenient temperature. Small variations in temperature are not critical. The operating temperature will normally be selected as the temperature at which all of th components to be separated are in the gas phase in the separator chamber. In the case of some materials, this may require relatively high temperatures, while in the case of materials which are normally gaseous at normal room temperature, normal room temperature can be used. In some cases, very low operting temperatures may be preferable. The range of operating temperatures is thus from about −50° to about 500° C., and preferably from about −20° to about 300° C.

As indicated previously, it has been found advantageous to blend the gas mixture to be separated with an inert gas of lower molecular or atomic weight. An increased degree of separation is obtained, and the effect is particularly marked at amounts of inert gas in excess of about 25% by volume of the blend, and especially in excess of about 60% by volume of the blend. This effect is believed to be due to an increase in the sonic velocity of the gas, because of the reduced average molecular or atomic weight of the blend, and some influence on the overall diffusion mechanism.

While any gas can be used that is inert to, i.e. does not react appreciably with, the gas mixture to be separated, it must have a molecular or atomic weight less than the gas mixture, and preferably as low a molecular or atomic weight as possible, so that hydrogen and helium are preferred. However, nitrogen, methane, ethane, carbon monoxide, carbon dioxide, and water also can be used.

In the case where an inert gas is used, the process can be operated at a gas inlet absolute pressure higher than 1000 mm. As a practical matter, gas inlet and outlet absolute pressures up to about 500 atmospheres can be used, but this limit can be exceeded if equipment permits.

After the separation has been effected, the inert gas can be separated by conventional techniques such as condensation of the heavier or less volatile separated components.

In the case where the gas mixture is to be subjected to a number of vortex stages, it is advatageous to employ an array of vortex separators or cyclones, arranged in two series, in cascade. A typical cascade series which can be used is described by Avery, *Physics Bulletin* (1970), page 18. The core portion from each cyclone stage is combined with the apex portion from a later cyclone stage, and this repeated at each stage to the end of the series, while in the other series, the apex portions are combined with the core portions from later stages. Any arrangement of cyclones and the feedback can be used. In this way, no part of the material need be wasted, and eventually all of the components separated can be recovered, if desired.

Figures 1, 2, 3:
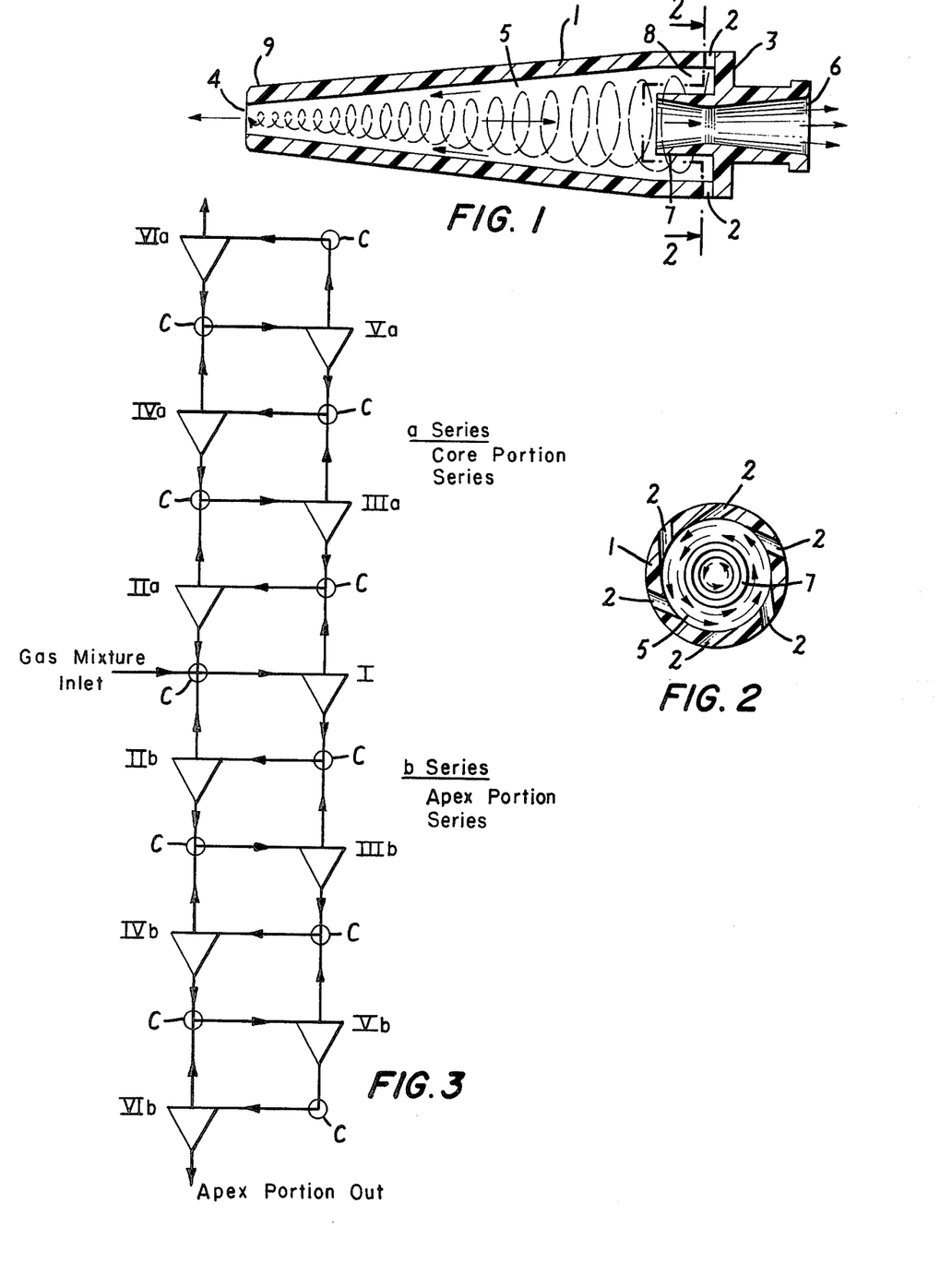
FIG. 1 shows in longitudinal section a typical conical cyclonic separator which can be used in the process of the invention.
FIG. 2 is a view taken along the lines 2—2 of FIG. 1, and shows the cyclonic separator thereof in cross-section, with the peripheral portions and the core portions of the vortex flow being delineated.
FIG. 3 show diagrammatically a typical array of cyclone separators, arranged in a twin cascading Series $a$ and $b$ of core portion cyclones and apex portion cyclones, respectively, showing the flow of the core portions and the apex portions through each series, to the final separation of the components of the gaseous mixture at the end of each series.

The cyclone of FIGS. 1 and 2 has a housing 1 with six gas inlets 2 arranged tangentially at the base 3 of the conical separation chamber 5. The gas outlet 4 for the peripheral portion of the vortex is at the apex end 9 of the conical separation chamber 5, and the gas outlet 6 for the core portion of the vortex is at the base end of the chamber. The inner end of the tube 7 projects inwardly from the base of the cone, and defines an annulus 8 into which the gas inlets 2 open. The gas inlets 2 because they are placed tangentially initiate a vortical flow of gas shown by the helical arrow, about the annulus 8 defined by the inner end of the tube 7. The vortical flow thus created proceeds along the periphery of the cone towards the outlet 4, and in the course of this travel the components of heavier molecular weight or atomic weight are thrown to the peripheral portion of the vortex, while the components of lower molecular weight or atomic weight are drawn towards the core portion of the vortex. The core portion of the vortex is drawn in the opposite direction, towards outlet 6. There is thus a countercurrent flow of the inner and outer vortices, and this promotes efficient separation, besides appreciably increasing the zone of separation.

In operation, the gas mixture entering via the inlets 2 describes a vortex about the periphery of the chamber, and there is a peripheral flow of gas towards the outlet 4. At the same time, a core portion is formed at the center of the vortex, and the gas flow in this portion is in the opposite direction, towards the core portion outlet 6. The pressure in this core portion is reduced compared to the pressure at the inlet 2. In this way, the lower molecular weight portion leaves the vortex separator via the outlet 6, and the heavier molecular weight portion leaves the separator via the outlet 4.

An array of these cyclones in two cascading Series $a$ and $b$ to provide a plurality of centrifugal separation stages can take the form shown in FIG. 3. The gas mixture enters the inlet via compressor C to the first cyclonic separator I, blended in the compressor C with apex portion from cyclonic separator II$a$ and core portion from cyclonic separator II$b$. Series $a$ concentrates or enriches with respect to a lighter component. The core portion is drawn off at the base of I, and passed to the next separator II$a$ of the Series, blended with apex portion from cyclonic separator III$a$; thence as core portion to cyclonic separator III$a$, blended with apex portion from separator IV$a$; thence as core portion to cyclonic separator IV$a$, blended with apex portion from V$a$; thence as core portion to cyclonic separator V$a$, blended with apex portion from separator V$b$; thence as core portion to cyclonic separator VI$a$.

In this way, the core portions become successively more and more concentrated in the lighter component, and finally at VI$a$, the end of the Series, the lighter component is withdrawn from the system.

Series $b$ concentrates with respect to a heavier component. The apex portion from I is drawn off at the apex, and passes via compressor C to cyclonic separator II$b$, blended with core portion from III$b$; the apex portion drawn off and fed to the separator III$b$, after blending with core portion from IV$b$; the apex portion drawn off from III$b$ and fed to IV$b$, after blending with core portion from V$b$; the apex portion drawn off and fed to V$b$, after blending with core portion from VI$b$; the apex portion from V$b$ drawn off and fed to VI$b$. Thus, the apex portions become successively concentrated in the heavier component.

The following Examples in th opinion of the inventor represent preferred embodiments of the invention.

EXAMPLE 1

The cyclones used in this test were of the type shown in FIGS. 1 and 2. These cyclones were used to separate carbon dioxide from air in mixtures of approximately constant composition, containing 8.5 volume percent $CO_2$. The gas flowed from a receptacle through a reducing valve, a filter, a control valve and a venturi flow meter, to the container with the cyclones. The two fractions from the cyclones were passed through venturi meters and control valves to a vacuum pump, and a portion drawn off through the valves to a gas analyzer for analysis. The gas pressures in the cyclone container compartments were measured with absolute mercury manometers to an accuracy of approximately 0.5 mm. of mercury.

The difference in $CO_2$ content between the two fractions from the cyclones was registered by means of an infrared analyzer and a connected potentiometric recorder.

The following data, Tables I, II, and III, were obtained with the 2 mm. cyclone. This cyclone had a cone angle of 5.7° and three or six uniformly spaced inlet openings of rectangular cross section, 0.6 mm. by 0.3 mm.

TABLE 1

| CYCLONIC SEPARATOR | | P inlet mm. Hg. | P core outlet mm.Hg. | P apex outlet mm.Hg. | Mole % $CO_2$ | Flow Rate l(STP)/min.[+] | Separation Factor | Flow Distribution Factor |
|---|---|---|---|---|---|---|---|---|
| | | 90.0 | 15.0 | 13.0 | 8.35 | 0.50 | 0.0542 | 0.663 |
| Number of inlet | | 90.0 | 15.0 | 15.0 | 8.35 | 0.50 | 0.0539 | 0.647 |
| openings | 3 | 90.0 | 15.0 | 17.0 | 8.35 | 0.50 | 0.0532 | 0.653 |
| | | 90.0 | 15.0 | 19.0 | 8.35 | 0.50 | 0.0524 | 0.653 |
| Base outlet | | 90.0 | 15.0 | 21.0 | 8.35 | 0.50 | 0.0516 | 0.644 |
| diameter (mm.) | 0.75 | 90.0 | 15.0 | 30.0 | 8.35 | 0.49 | 0.0443 | 0.596 |
| Apex outlet | | 90.0 | 18.0 | 14.0 | 8.35 | 0.50 | 0.0544 | 0.672 |
| diameter (mm.) | 1.0 | 90.0 | 18.0 | 16.0 | 8.35 | 0.50 | 0.0528 | 0.665 |
| | | 90.0 | 18.0 | 18.0 | 8.35 | 0.50 | 0.0524 | 0.657 |
| | | 90.0 | 18.0 | 20.0 | 8.35 | 0.50 | 0.0511 | 0.652 |
| | | 90.0 | 18.0 | 22.0 | 8.35 | 0.48 | 0.0513 | 0.640 |
| | | 90.0 | 18.0 | 24.0 | 8.35 | 0.50 | 0.0499 | 0.645 |
| | | 90.0 | 18.0 | 26.0 | 8.35 | 0.50 | 0.0488 | 0.627 |
| | | 90.0 | 18.0 | 30.0 | 8.35 | 0.49 | 0.0443 | 0.525 |
| | | 90.0 | 22.0 | 16.0 | 8.35 | 0.50 | 0.0523 | 0.670 |
| | | 90.0 | 22.0 | 20.0 | 8.35 | 0.50 | 0.0514 | 0.666 |
| | | 90.0 | 22.0 | 22.0 | 8.35 | 0.50 | 0.0515 | 0.669 |
| | | 90.0 | 22.0 | 24.0 | 8.35 | 0.50 | 0.0514 | 0.650 |
| | | 90.0 | 22.0 | 26.0 | 8.35 | 0.50 | 0.0487 | 0.645 |
| | | 90.0 | 25.0 | 18.0 | 8.35 | 0.48 | 0.0489 | 0.724 |
| | | 90.0 | 25.0 | 20.0 | 8.35 | 0.48 | 0.0484 | 0.718 |
| | | 90.0 | 25.0 | 22.0 | 8.35 | 0.48 | 0.0499 | 0.711 |
| | | 90.0 | 25.0 | 24.0 | 8.35 | 0.48 | 0.0483 | 0.708 |
| | | 90.0 | 25.0 | 26.0 | 8.35 | 0.48 | 0.0479 | 0.683 |
| | | 90.0 | 25.0 | 28.0 | 8.35 | 0.48 | 0.0470 | 0.667 |

[+]Liters per min. at 0° C, 1 atm.

TABLE II

| CYCLONIC SEPARATOR | | P inlet mm. Hg. | P core outlet mm.Hg. | P apex outlet mm.Hg. | Mole % $CO_2$ | Flow Rate l(STP)/min.[+] | Separation Factor | Flow Distribution Factor |
|---|---|---|---|---|---|---|---|---|
| Number of inlet | | 90.0 | 15.0 | 14.0 | 8.35 | 0.46 | 0.0435 | 0.657 |
| openings | 6 | 90.0 | 15.0 | 16.0 | 8.35 | 0.46 | 0.0435 | 0.657 |
| | | 90.0 | 15.0 | 20.0 | 8.35 | 0.46 | 0.0436 | 0.691 |
| Base outlet | | 90.0 | 18.0 | 16.0 | 8.35 | 0.46 | 0.0440 | 0.665 |
| diameter (mm.) | 0.75 | 90.0 | 18.0 | 18.0 | 8.35 | 0.46 | 0.0430 | 0.671 |
| Apex outlet diameter(mm.) | 1.0 | | | | | | | |

[+]liters per min. at 0° C, 1 atm.

TABLE III

| CYCLONIC SEPARATOR | | P inlet mm. Hg. | P core outlet mm.Hg. | P apex outlet mm.Hg. | Mole % $CO_2$ | Flow Rate l(STP)/min.[+] | Separation Factor | Flow Distribution Factor |
|---|---|---|---|---|---|---|---|---|
| Number of inlet | | 90.0 | 15.0 | 13.0 | 8.67 | 0.51 | 0.0572 | 0.520 |
| openings | 3 | 90.0 | 15.0 | 15.0 | 8.67 | 0.51 | 0.0567 | 0.513 |
| | | 90.0 | 15.0 | 17.0 | 8.67 | 0.50 | 0.0565 | 0.514 |
| Base outlet | | 90.0 | 15.0 | 19.0 | 8.67 | 0.50 | 0.0554 | 0.498 |
| diameter (mm.) | 1.0 | 90.0 | 15.0 | 21.0 | 8.67 | 0.50 | 0.0541 | 0.487 |
| | | 90.0 | 18.0 | 16.0 | 8.67 | 0.50 | 0.0552 | 0.535 |
| Apex outlet | | 90.0 | 18.0 | 18.0 | 8.67 | 0.50 | 0.0548 | 0.526 |
| diameter (mm.) | 1.0 | 90.0 | 18.0 | 20.0 | 8.67 | 0.50 | 0.0530 | 0.511 |
| | | 90.0 | 18.0 | 22.0 | 8.67 | 0.50 | 0.0519 | 0.491 |
| | | 90.0 | 18.0 | 24.0 | 8.67 | 0.50 | 0.0515 | 0.471 |
| | | 90.0 | 22.0 | 20.0 | 8.67 | 0.50 | 0.0504 | 0.566 |
| | | 90.0 | 22.0 | 22.0 | 8.67 | 0.50 | 0.0503 | 0.554 |
| | | 90.0 | 22.0 | 24.0 | 8.67 | 0.50 | 0.0511 | 0.525 |
| | | 90.0 | 22.0 | 26.0 | 8.67 | 0.49 | 0.0486 | 0.481 |
| | | 90.0 | 25.0 | 23.0 | 8.67 | 0.49 | 0.0457 | 0.598 |
| | | 90.0 | 25.0 | 25.0 | 8.67 | 0.49 | 0.0460 | 0.573 |
| | | 90.0 | 25.0 | 27.0 | 8.67 | 0.49 | 0.0455 | 0.542 |
| | | 90.0 | 25.0 | 29.0 | 8.67 | 0.48 | 0.0438 | 0.498 |

[+]liters per min. at 0° C., 1 atm.

The separation factor E is defined by the equation $$E = \frac{x_{apex} - x_{core}}{x_{core}(1 - x_{apex})}$$

where $x$ is the mole fraction, in this case, of carbon dioxide, in the gas. The greater the separation factor, the more effective the separation. The flow distribution factor is defined as the molar flow fraction of the incoming gas leaving through the apex outlet. It is apparent from the data that good separation is obtained.

The cyclones of the invention are useful in the separation of gas mixtures into their components according to molecular weight or atomic weight. It is possible in this way to separate isotopes of various elements in the form of gaseous compounds, which after separation can be treated to recover the element in any desired form, including the elemental metal. It is possible, for example, to separate U 235 from U 238 in the mixtures thereof as uranium hexafluoride.

EXAMPLE 2

The isotope U 235 is separated from U 238 in uranium hexafluoride gas, in accordance with the following procedure.

The apparatus is composed of 813 stages in an array whose through flow is in accordance with the diagram shown in FIG. 3. Each separator chamber has a 2 mm. base diameter, and a 1.2 mm. diameter at the core and the apex outlets. The separator chambers are conical, as shown in FIGS. 1 and 2, with a length of 10 mm. The inlet pressure is 90 mm. Hg.; the core and apex gas outlet pressures are 15 mm Hg. The pressure ratio is 6. The gas entrance velocity in the separation chamber is the velocity of sound.

The gas mixture introduced in the first cyclone separator stage contains 99.3% U 238 and 0.7% U 235. In each of the Series $a$ cyclone stages, the core fraction is enriched in U 235. The gas emerging from the last cyclone stage (counted from the feed stage) of the core portion Series $a$ is enriched in U 235 to 3%, and the gas obtained from the apex portion Series $b$ of cyclones contains nearly all U 238 and a very small amount, 0.2%, of U 235.

EXAMPLE 3

The cyclones used in this test were of the type shown in FIGS. 1 and 2. The cyclones were used to separate carbon monoxide from carbon dioxide in a mixture containing about 25% CO, and about 75% $CO_2$, and blended with the amounts of helium shown in Tables IV and V. The gas blend flowed through a system as in Example 1, and the composition of the two fractions from the cyclones measured by infrared analyzers in the same way.

The data obtained using a 2 mm. cyclone is given in Table IV. The data obtained using a 1 mm. cyclone is given in Table V. The cone angle of the cyclone in both cases was 5.7°.

The separation factor E is defined by the equation $$E = \frac{x_{apex} - x_{core}}{x_{core}(1 - x_{apex})}$$

where $x$ is the mole fraction of carbon dioxide in the mixture carbon monoxide-carbon dioxide (excluding the helium). The flow distribution factor is defined as the molar flow fraction of the incoming gas leaving through the apex outlet. It is apparent from the data that good separation is obtained, and that the separation factor increases as the amount of helium increases.

EXAMPLE 4

The isotope U 235 is separated from U 238 in uranium hexafluoride gas blended with helium gas, in accordance with the following procedure.

The apparatus used is composed of 200 stages in an array whose through flow is in accordance with the diagram in FIG. 3. Each separator chamber has a 2 mm. maximum cone diameter and a 1 mm. diameter at the core outlet and at the apex outlet. The separator chambers are conical, as shown in FIGS. 1 and 2, with a length of 10 mm. The inlet pressure is 300 mm. Hg. The core and apex gas outlet pressures are 60 mm. Hg. The pressure ratio is 5. The gas entrance velocity in the separation chamber is the velocity of sound.

The uranium hexafluoride introduced into the first cyclone separation stage contains 99.3% U 238 and 0.7% U 235. The feed to each cyclone separator stage is regulated to contain 90% helium, the same in each, by blending appropriate selected fraction from subsequent Series $a$ stages as shown in FIG. 3. In each of the Series $a$ cyclone stages, the core fraction is enriched in U 235, the gas emerging from the last stage of the core portion Series $a$ enriched in U 235 to 3%, and the gas obtained for the apex portion Series $b$ of cyclones contains nearly all U 238 and a very small amount, 0.2%, of U 235.

TABLE IV

| CYCLONIC SEPARATOR | P inlet mm. Hg. | P core outlet mm. Hg. | P apex outlet mm. Hg. | Mole % He | Flow Rate l(STP)/min.+ | Separation Factor | Flow Distribution Factor |
| --- | --- | --- | --- | --- | --- | --- | --- |
| No. of inlet openings 3 | 180 | 36 | 36 | 0 | 0.50 | 0.044 | 0.63 |
| Base diameter 2 mm. | 180 | 36 | 36 | 62.8 | 0.75 | 0.067 | 0.38 |
| Base outlet diameter 1 mm. | 180 | 36 | 36 | 69.5 | 0.81 | 0.082 | 0.38 |
| Apex outlet diameter 1 mm. | 180 | 36 | 36 | 76.1 | 0.92 | 0.106 | 0.41 |
|  | 180 | 36 | 36 | 77.3 | 0.98 | 0.112 | 0.42 |
|  | 180 | 36 | 36 | 78.9 | 1.09 | 0.114 | 0.43 |
|  | 180 | 36 | 36 | 85.0 | 1.22 | 0.126 | 0.45 |
|  | 180 | 36 | 36 | 88.3 | 1.33 | 0.146 | 0.45 |
|  | 180 | 36 | 36 | 92.9 | 1.50 | 0.147 | 0.46 |

+liters per min. at 0° C, 1 atm.

TABLE V

| CYCLONIC SEPARATOR | P inlet mm. Hg. | P core outlet mm. Hg. | P apex outlet mm. Hg. | Mole % He | Flow Rate l(STP)/min.+ | Separation Factor | Flow Distribution Factor |
| --- | --- | --- | --- | --- | --- | --- | --- |
| No. of inlet openings 3 | 180 | 36 | 36 | 47.7 | 0.29 | 0.071 | 0.43 |
| Base diameter 1 mm. | 180 | 36 | 36 | 62.4 | 0.32 | 0.096 | 0.44 |
| Base outlet diameter 0.6 mm. | 180 | 36 | 36 | 85.0 | 0.42 | 0.123 | 0.46 |
| Apex outlet diameter 1 mm. | 180 | 36 | 36 | 88.3 | 0.45 | 0.128 | 0.47 |
|  | 180 | 36 | 36 | 92.9 | 0.50 | 0.137 | 0.48 |
|  | 300 | 60 | 60 | 47.7 | 0.51 | 0.063 | 0.41 |
|  | 300 | 60 | 60 | 62.4 | 0.58 | 0.073 | 0.42 |
|  | 300 | 60 | 60 | 77.3 | 0.67 | 0.115 | 0.43 |
|  | 300 | 60 | 60 | 85.0 | 0.76 | 0.130 | 0.44 |
|  | 300 | 60 | 60 | 88.3 | 0.81 | 0.144 | 0.44 |

+liters per min at 0° C, 1 atm.

EXAMPLE 5

Samples of purified uranium hexafluoride ($UF_6$) and helium (92% He, 8% $UF_6$ by volume) were prepared as follows. The vessel containing the purified $UF_6$ was connected to an evacuated sample container. The vessel was kept at 18° C in a constant temperature bath, and the containers cooled by liquid nitrogen. The amount of $UF_6$ thus transferred to the container was determined by weighing. The difference between the $UF_6$-contents of sample pairs was kept at less than 2%. The $UF_6$ in the containers was then dissolved in 3 g carbon tetrachloride (tetrachloromethane, $CCl_4$) which was likewise transferred to the container by distillation, to give a homogeneous sample.

The same containers were made of aluminum, which has a relatively low absorption of gamma-rays. The wall thickness was 1.75+ −0.01 mm.

A well-type sodium iodide (NaI)-detector coupled to a multichannel analyzer was used to measure the gamma-ray emission from the samples for the range from 50 to 210keV, at 3 keV per channel. The number of counts belonging to the characteristic peak at 185 keV, corrected for the influence of Thorium 634 (Th-234) peaked at 94 keV, was taken as a measure of the U-235 content of the sample. The background radiation proved to be of negligible importance. The containers fitted very closely into the detector well.

The apparatus used was composed of four cyclone separators, in parallel, constituting one stage of a cascade in accordance with the diagram in FIG. 3. Each cyclone separator chamber had a 2 mm. maximum cone diameter, and a 1 mm. diameter at the core outlet and at the apex outlet. The separator chambers were conical, as shown in FIGS. 1 and 2, with a length of 10 mm.

The inlet pressure used was 180 mm. Hg. The pressure in the enriched stream (base outlet) from the cyclones was fixed at 36 mm. Hg. while the pressure in the depicted stream (apex outlet) was varied between 36 and 65 mm. Hg.

Several runs were made under these conditions, and the separation efficiency determined by way of the separation factor.

The following results were obtained:

TABLE VI

| RUN NO. | SEPARATION FACTOR (E × 10³) | URANIUM DISTRIBUTION RATIO ($\theta$) |
|---|---|---|
| 1 | 10 | 0.20 |
| 2 | 20 | 0.33 |
| 3 | 23 | 0.50 |
| 4 | 13 | 0.67 |

Figure 4:
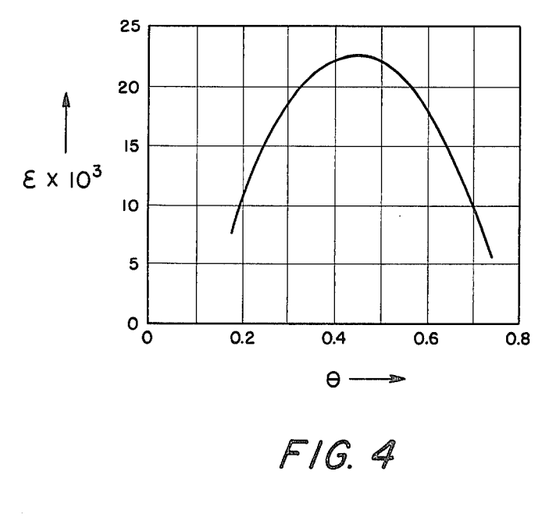
FIG. 4 is a graph of observed values of the separation factor $\epsilon$ against the uranium distribution ratio $\theta$ of the data in Table VI.

The observed separation factor is plotted against the uranium distribution ratio $\theta$ for four of the runs in the graph shown in FIG. 4.

The uranium distribution ratio $\theta$ is defined as:

$$\theta = \frac{\text{Molar flow rate uranium through apex outlet}}{\text{Total molar flow rate uranium through apex and base outlets}}$$

As the curve shows, the separation factor reaches a maximum value of about 23 ×10³ at a value of $\theta$ of about 0.5.

This is quite significant to power consumption; it means that an equivolume distribution of effluent flow at the apex and base outlets of the cyclones can be used in the simplest form of cascade, of the type shown in FIG. 3, and will give minimum power consumption. Consequently, in the operation of the cascade equal flow volumes can be maintained in the return and forward flows from the apex and base ends of cyclone I, and thence through every cyclone in the a and b series II to VI, etc., which is a very convenient way to operate, and in this way when operating at maximum separation efficiency the power consumption will be at a minimum. Also the whole installation is simple and less expensive.

Accordingly, in the light of the above results, the isotope U 235 is separated from U 238 in uranium hexafluoride gas blended with helium gas, in accordance with the following procedure.

The apparatus used is composed of 200 stages in an array whose through flow is in accordance with the diagram in FIG. 3. Each separator chamber has a 2 mm. maximum cone diameter and a 1 mm. diameter at the core outlet and at the apex outlet. The separator chambers are conical, as shown in FIGS. 1 and 2, with a length of 10 mm. The inlet pressure is 180 mm. Hg. The core and apex gas outlet pressures are 36 mm. Hg. The pressure ratio is 5. The gas entrance velocity in the separation chamber is the velocity of sound. Equal flow volumes are maintained in the effluent gas at the apex outlet and base outlet of each cyclone in each series.

The uranium hexafluoride introduced into the first cyclone separation stage contains 99.3% U 238 and 0.7% U 235. The feed to the first cyclone separator stage contains 29% helium, and 8% $UF_6$ by volume, and proceeds to subsequent stages in the series by blending equal volumes of feed and fraction selected from a subsequent Series a stage as shown in FIG. 3. Each stage is operated at a uranium distribution ratio $\theta$ of about 0.5. In each of the Series a cyclone stages, the core fraction is enriched in U 235, the gas emerging from the last stage of the core portion Series a being enriched in U 235 to 3%, and the gas obtained from the final stages apex portion of Series b of cyclones containing nearly all U 238, and a very small amount, 0.2% of U 235.

The cyclones of the invention are also useful as the molecule separator stage in gas chromatography-mass spectrometry systems. Such systems combine two physicochemical methods, using the molecule separator of the invention as the key function. Gas chromatography is a most efficient technique for separating components of organic compounds with sufficient volatility and thermostability, while mass spectrometry is a unique method for identifying those components. The direct introduction of separated gaseous components from the gas chromatography column via the cyclones of the invention to the mass spectrometer reduces dead volume to a minimum, achieves a fast flow rate, and provides high sample-to carrier gas enrichment. The gas chromatography and mass spectrometers employed can be conventional. A suitable system, for instance, is the LKB gas chromatography-mass spectrometry system, which includes a single-focusing mass spectrometer equipped with a 60° sector, 20 cm. radius magnetic analyzer, and sweep generator for fast scanning of spectra, a rhenium filament to provide an ion source of the electron bombardment type, and a measuring system including a 14-stage electron multiplier, electrometer, and a wide band amplifier feeding a direct-writing UV oscillograph. A helium carrier gas is used, and the sample is injected through the gas chromatographic column with helium.

Having regard to the foregoing disclosure, the following is claimed as the inventive and patentable embodiments thereof:

1. A process for separation of a gas isotope mixture into at least two gaseous component fractions according to their molecular or atomic weight, comprising applying centrifugal force in a cyclone by rotating the mixture in a vortex having peripheral and core vortices and a diameter of not over 5 mm. at a gas inlet absolute pressure of from about 5 to about 1000 mm. Hg., and a pressure ratio $$P_{inlet} \text{ mm. Hg.}/P_{core\ outlet} \text{ mm. Hg.}$$

within the range from about 1.5 to about 10; recovering a higher molecular or atomic weight gaseous isotope fraction from the peripheral vortex, and recovering a lower molecular or atomic weight gaseous isotope fraction from the core vortex.

2. A process according to claim 1, in which isotopes of differing atomic weight in a mixture of gaseous compounds thereof are separated.

3. A process according to claim 1, in which the vortex is conical.

4. A process according to claim 1, in which the vortex has a diameter of not over 2 mm.

5. A process according to claim 1, in which the vortex has a diameter of from 1 to 0.1 mm.

6. A process according to claim 1, in which the gas isotope mixture comprises a mixture of uranium isotopes in the form of gaseous uranium compounds.

7. A process according to claim 1, in which the gas mixture velocity is at least at the velocity of sound in the gas mixture at the temperature of operation.

8. A process according to claim 1, in which the fractions thus separated from the mixture are subjected to successive vortical separation stages under the stated conditions to further enrich them in at least one member selected from the group consisting of higher molecular or atomic weight fractions, lower molecular or atomic weight fractions, and both.

9. A process according to claim 8 in which the successive vortical separation stages are operated at a uranium distribution ratio of about 0.5.

10. A process according to claim 1, in which the gas isotope mixture is blended with an inert gas of lower molecular or atomic weight than the said mixture, and the blend is then rotated in the vortex, the gas inlet absolute pressure is from about 5 mm Hg. to about 500 atmospheres, and the pressure ratio is within the range from about 0.001 to about 10.

11. A process according to claim 10 in which the inert gas is hydrogen or helium.

12. A process according to claim 10 in which the inert gas comprises at least 25% by volume of the total gas mixture.

13. A process according to claim 10 in which the inert gas comprises at least 60% by volume of the total gas mixture.

14. A process according to claim 13, in which the uranium compounds are uranium hexafluorides.

15. A process according to claim 10 in which the gas mixture velocity is at least at the velocity of sound in the gas mixture at the temperature of operation.

16. A process for separation of a gas isotope mixture in admixture with an inert gas of lower molecular or atomic weight than the said mixture into at least two gaseous component fractions according to their molecular or atomic weight, comprising applying centrifugal force in a cyclone by rotating the mixture in a conical vortex having peripheral and core vortices and a diameter of not over 5 mm. and a cone angle within the range from 1° to 90°, at a gas inlet absolute pressure of at least 5 mm. Hg., and a pressure ratio $$P_{inlet} \text{ mm. Hg.}/P_{core\ outlet} \text{ mm. Hg.}$$

of up to 10; recovering a higher molecular or atomic weight gaseous isotope fraction from the peripheral vortex, and recovering a lower molecular or atomic weight gaseous isotope fraction from the core vortex.

17. A process according to claim 16, in which isotopes of differing atomic weight in a mixture of gaseous compounds thereof are separated.

18. A process according to claim 16, in which the cone angle is within the range from 3° to 30°.

19. A process according to claim 16, in which the vortex has a diameter of not over 2 mm.

20. A process according to claim 16, in which the vortex has a diameter of from 1 to 0.1 mm.

21. A process according to claim 16, in which the gas mixture velocity is at least at the velocity of sound in the gas mixture at the temperature of operation.

22. A process according to claim 16, in which the inert gas is hydrogen or helium.

23. A process according to claim 16, in which the gas mixture velocity is at least at the velocity of sound in the gas mixture at the temperature of operation.

24. A process according to claim 16, in which the inert gas comprises at least 25% by volume of the total gas mixture.

25. A process according to claim 16, in which the inert gas comprises at least 60% by volume of the total gas mixture.

26. A process according to claim 16, in which the fractions thus separated from the mixture are subjected to successive vortical separation stages under the stated conditions to further enrich them in at least one member selected from the group consisting of higher molecular or atomic weight fractions, lower molecular or atomic weight fractions, and both.

27. A process according to claim 26 in which the successive vortical separation stages are operated at a uranium distribution ratio of about 0.5.

28. A process according to claim 16, in which the gas isotope mixture comprises a mixture of uranium isotopes in the form of gaseous uranium compounds.

29. A process according to claim 28, in which the uranium compounds are uranium hexafluorides.

* * * * *

UNITED STATES PATENT OFFICE
CERTIFICATE OF CORRECTION

Patent No. 4,092,130   Dated May 30, 1978

Inventor(s) Nils A. L. Wikdahl

It is certified that error appears in the above-identified patent and that said Letters Patent are hereby corrected as shown below:

| | | |
|---|---|---|
| Column 3, line 4 | : | insert --however,-- before "it" |
| Column 3, line 10 | : | insert --from-- after "U 235" |
| Column 3, line 42 | : | "separate" should be --separator-- |
| Column 4, line 51 | : | "vertical" should be --vortical-- |
| Column 5, line 64 | : | "core" should be --cone-- |
| Column 6, line 3 | : | "the" (first occurrence) should read -- this -- |
| Column 6, line 43 | : | "th" should be --the-- |
| Column 8, line 35 | : | "passes" should be --passed-- |
| Column 9, Table III last column, last number | : | "0.498" should be --0.489-- |
| Column 11, line 6 | : | insert --used-- after "apparatus" |
| Column 13, line 16 | : | "same" should be --sample-- |
| Column 13, line 18 | : | "1.75 $^+_-$ 0.01" should be --1.75 $\pm$ 0.01-- |

UNITED STATES PATENT OFFICE
CERTIFICATE OF CORRECTION

Patent No. 4,092,130      Dated May 30, 1978

Inventor(s) Nils A. L. Wikdahl

It is certified that error appears in the above-identified patent and that said Letters Patent are hereby corrected as shown below:

Column 13, line 38 : "depicted" should be --depleted--

Column 16, line 37 : "16" should be --22--
Claim 23, line 1

Signed and Sealed this

Twenty-eighth Day of November 1978

(SEAL)

Attest:

RUTH C. MASON
*Attesting Officer*

DONALD W. BANNER
*Commissioner of Patents and Trademarks*